United States Patent [19]

Newsom

[11] Patent Number: 4,732,639

[45] Date of Patent: Mar. 22, 1988

[54] VACUUM BAGGING APPARATUS

[76] Inventor: Cosby M. Newsom, 15517 S. Seaforth Ave., Norwalk, Calif. 90650

[21] Appl. No.: 900,141

[22] Filed: Aug. 25, 1986

Related U.S. Application Data

[63] Continuation-in-part of Ser. No. 771,520, Aug. 30, 1985, abandoned.

[51] Int. Cl.$^4$ .................. B29C 65/00; B32B 35/00
[52] U.S. Cl. .................. 156/382; 425/389; 425/DIG. 19
[58] Field of Search .............. 220/378, 3; 224/202 R; 156/285–286, 229, 381–382, 583.3; 264/510, 552, 571, 573, 554, 316; 425/389, DIG. 19; 269/21; 279/3

[56] References Cited

U.S. PATENT DOCUMENTS

| | | | |
|---|---|---|---|
| 1,878,677 | 9/1932 | Curtis | 220/378 |
| 2,654,921 | 10/1953 | Blanchard | 220/378 |
| 3,738,665 | 6/1973 | Bilco | 277/3 |
| 4,280,804 | 7/1981 | Holland | 264/316 |
| 4,287,015 | 9/1981 | Danner, Jr. | 156/285 |
| 4,554,036 | 11/1985 | Newsom | 156/382 |

Primary Examiner—Merrell C. Cashion, Jr.
Attorney, Agent, or Firm—Cislo & Thomas

[57] ABSTRACT

A bonding apparatus for vacuum bagging is disclosed comprising a base having a top surface provided with an outer peripheral vacuum manifold, a diaphragm having a top member and side walls adapted for placement on the base and in conjunction therewith defining a chamber encompassing a work piece; one or more evacuation ports formed in the base or the diaphragm adapted for connection to a vacuum source whereby the chamber may be evacuated of ambient atmosphere to form a vacuum therein; and an edge member associated with the side walls, including a solid, conformable seal adapted to seal the vacuum manifold and to provide at least a primary seal thereagainst. In one embodiment, intended for autoclaving applications, a seal providing both primary and secondary sealing is disclosed. The diaphragm, edge member and seal preferably comprise an elastomeric material.

15 Claims, 5 Drawing Figures

VACUUM BAGGING APPARATUS

CROSS-REFERENCE TO RELATED APPLICATION

The present application is a continuation-in-part application of Ser. No. 06/771,520, filed Aug. 30, 1985, now abandoned.

BACKGROUND OF THE INVENTION

This invention relates to bonding apparatus of the type employed in vacuum bagging, and, more particularly, to a seal around the perimeter of such apparatus.

Vacuum bag assemblies are used in making laminated products in which laminates are adhesively secured together. Vacuum bag assemblies are also used for effecting repairs such as on airplane components made of synthetics and laminates with or without metal, such as for example graphite fibers or sheets that are bonded into a unitary monolith by resin polymers, adhesives and other synthetic materials. Thus, where a flaw of fissure has developed in a laminate component, it may be repaired employing a vacuum bag assembly.

Examplary vacuum bag assemblies, such as disclosed in U.S. Pat. No. 4,287,015, typically comprise a air-tight base plate on which the laminations with their applied adhesives are placed. Next, an air-tight upstanding ribbing structure is affixed to the air-tight base plate and well spaced inwardly from the perimeter of air-tight base plate to surround the laminations with their applied adhesives. A stretchable air-tight vacuum bag membrane is laid cross the laminations with their applied adhesives and is extended beyond the laminations to completely contact the ribbing structure and to be held securely at selected locations along the perimeter of the air-tight base plate, while being stretched into continuous firm air sealing contact with the air-tight upstanding ribbing structure. Fastening means are usually employed to secure the stretchable air-tight vacuum bag membrane to the air-tight base plate along selected portions of the perimeter. Finally, a vacuum means is secured in part to the vacuum bag assembly, whereby a vacuum may be drawn within the vacuum volume determined by the air-tight base, the continuous air-tight upstanding ribbing structure and the stretchable air-tight vacuum bag membrane.

A problem with many conventional vacuum bagging systems is the recurring labor and material costs and the high degree of operator skill required. A reusable vacuum bag would minimize the recurring labor and material costs resulting in high quality bonding and it would only require minimal operator skill.

OBJECTS AND SUMMARY OF THE INVENTION

It is an object of the present invention to provide a bonding apparatus suitable for vacuum bagging applications employing a reusable vacuum bag.

It is another object of the present invention to provide a bonding apparatus suitable for vacuum bagging applications employing a reusable vacuum bag having an integral seal formed thereon.

It is yet another object of the present invention to provide an improved diaphragm for use in conjunction with a base in vacuum bagging applications having a solid, conformable V-shaped seal for sealing a vacuum manifold in the base.

It is a still further object of the present invention to provide an improved, reusable diaphragm, wherein the solid, conformable V-shaped seal is integrally formed with an edge member, which is associated with at least one vacuum port for drawing a vacuum during the vacuum bagging operations.

It is still another further and more specific and important object of the present invention to provide an improved, reusable diaphragm wherein the solid, conformable seal is provided with a back-up seal.

These and further objects of the invention will become more readily apparent when considered in light of the following commentary taken in conjunction with the drawing.

Briefly, a bonding apparatus for vacuum bag applications involving a work piece is provided. The bonding apparatus comprises a base and a contoured or conformable diaphragm. The base, which has a top surface, is provided with a peripheral vacuum manifold. The diaphragm has a top member and side walls adapted for placement on the base and in conjunction therewith, defines a chamber encompassing the work piece. One or more evacuation ports, formed either in the base or in the diaphragm, are adapted for connection to a vacuum source, whereby the chamber may be evacuated to form a vacuum therein.

In accordance with the invention, the side walls of the diaphragm are provided with an edge member which includes a solid, conformable seal adapted to seal the vacuum manifold. The solid conformable seal provides at least a first, or primary, seal against the vacuum manifold. In one embodiment, the solid conformable seal has a V-shaped cross-section. In a second embodiment, the solid conformable seal comprises both a V-shaped cross-section for providing a primary seal and a bulbous cross-section for providing a secondary seal. The secondary seal is especially suitable in autoclave applications, and comprises an intumescent material.

DETAILED DESCRIPTION OF THE PREFERRED EMBODIMENTS

Figure 1:
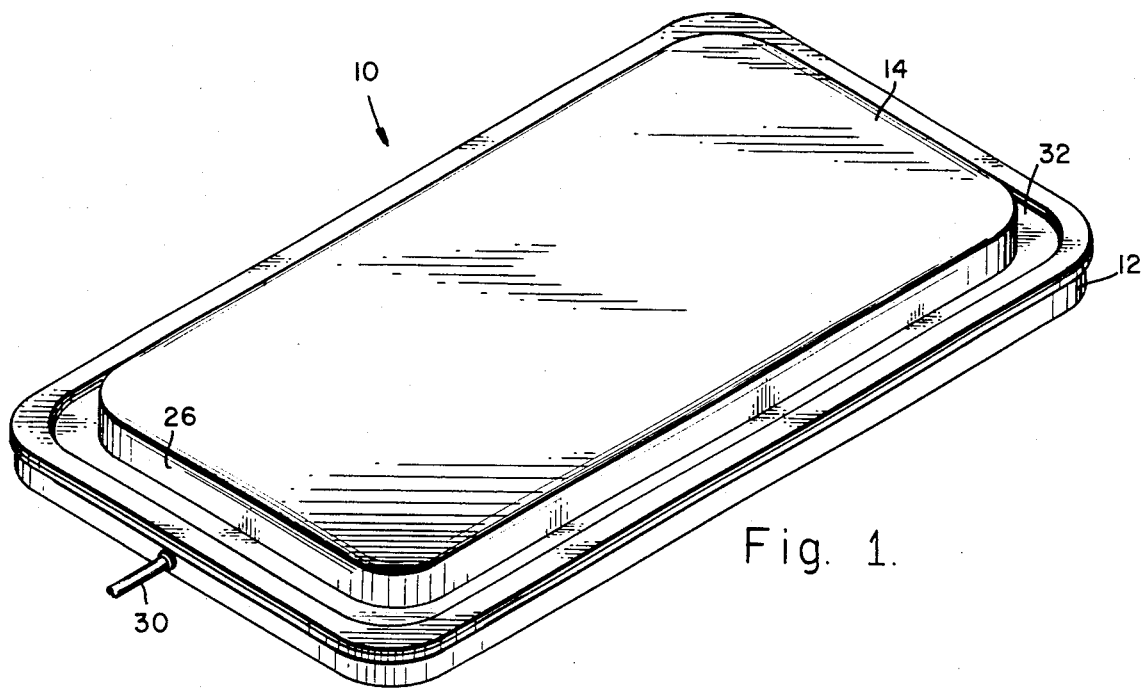
FIG. 1 is a perspective view of a bonding apparatus in accordance with the invention.

Referring now to the drawing wherein like numerals of reference represent like elements throughout, a bonding apparatus depicted generally at 10, is shown. The bonding apparatus comprises a base 12 and a diaphragm 14.

Figure 2:
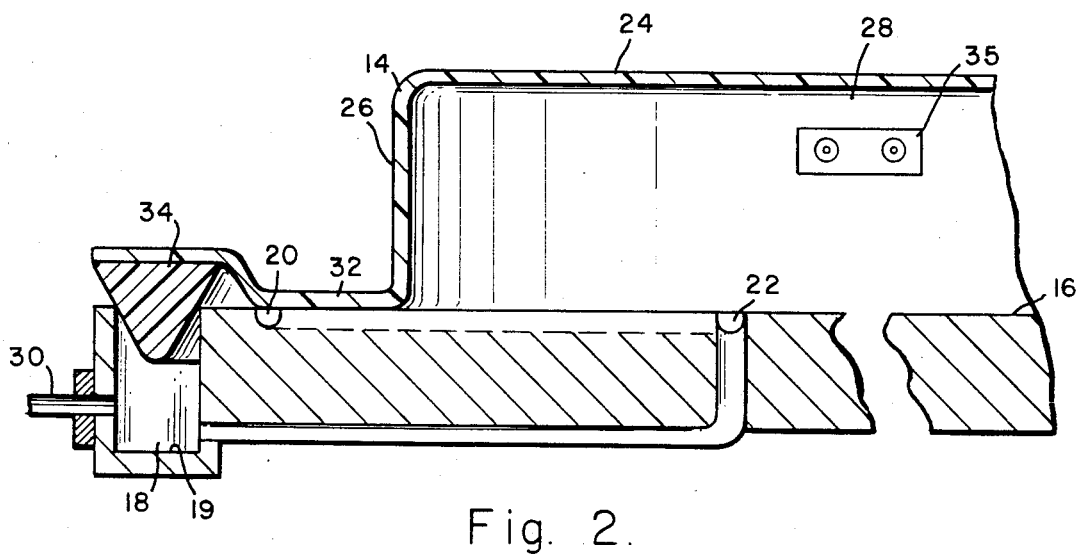
FIG. 2 is a cross-sectional view of a portion of FIG. 1, showing in detail the seal of the invention.

As seen more clearly in FIG. 2, the base 12 has a top surface 16 provided with an outer peripheral vacuum manifold 18, defined by seal groove 19, an inner peripheral vacuum groove 20 and at least one vacuum port 22. That is to say, the inner peripheral vacuum groove 20 surrounds the area intended for supporting a work piece (not shown) and in turn is surrounded by the outer peripheral vacuum manifold 18. An evacuation port 30 is provided which communicates between the vacuum manifold 18 and a vacuum source (not shown). The vacuum manifold 18 may be machined or electroformed into the base plate 12 or, as shown, may comprise a formed, welded-on channel.

The diaphragm 14 comprises a top member 24 and a downwardly depending side wall 26. The downwardly depending side wall 26 completely skirts the perimeter of the top member 24. The diaphragm 14 is adapted for placement on the base 12, and in conjunction therewith defines a chamber 28 which is suitable for encompassing the work piece. The height of the side wall 26 is such that a sufficient volumetric capacity is formed so as to encompass the work piece.

An edge member 32 is associated with the side wall 26 of the diaphragm 14 and overlies the peripheral vacuum groove 20, thereby providing an inner peripheral seal. At its termination, the edge member 32 includes a solid, contoured, V-shaped seal 34 which is adapted to seal the vacuum manifold 18, thereby providing an outer peripheral seal.

Although the invention is best suitably employed with a contoured vacuum bag (one which is curved to shape to fit over the work piece), a conformable vacuum bag (one which stretches over the work piece) may also be employed.

The entire contoured diaphragm 14, comprising top member 24, downwardly depending side wall 26, edge member 32 and V-shaped seal 34 is preferably of integral, one piece construction. However, various parts, particularly the V-shaped seal 34, may comprise separate pieces which are joined together by vulcanization or by an appropriate adhesive or other means to form an air-tight seal. In any event, the materials comprising the contoured diaphragm 14 are fabricated from conformable, resilient materials such as elastomers, plastics, rubbers and the like.

In selecting the materials comprising the diaphragm 14, it is preferred to employ elastomeric-type materials having flexibility and impermeability, as well as elongation and tear-resistant characteristics, keeping in mind the intended end-use of the device. Obviously, the materials of construction must be temperature resistant to withstand ambient to 400° F. and higher, and while the components making up the diaphragm 14 may be simply vulcanized or bonded into various shapes, it should be understood that other means of fabrication and other materials of construction may be found to be useful. For example, for temperatures greater than about 400° F., a formed metal top member 24 may be employed. It is only important that the contoured diaphragm 14 be capable of encompassing, circumscribing, and overlying a work piece area and that the edge member 32 be capable of forming a first vacuum seal with the surface of the base 12 (the inner peripheral seal) and that the V-shaped seal 34 be capable of forming an additional seal with the vacuum manifold 18 (the outer peripheral seal), whereby the chamber 28 may be evacuated for accomplishing the bonding process to which the invention relates.

The downwardly depending side wall 26 may be provided with a fluid-tight electrical connector member 35, whereby a thermal-blanket (not shown) may be connected to an electrical energy source for use in the bonding operation if found to be necessary.

Figure 3:
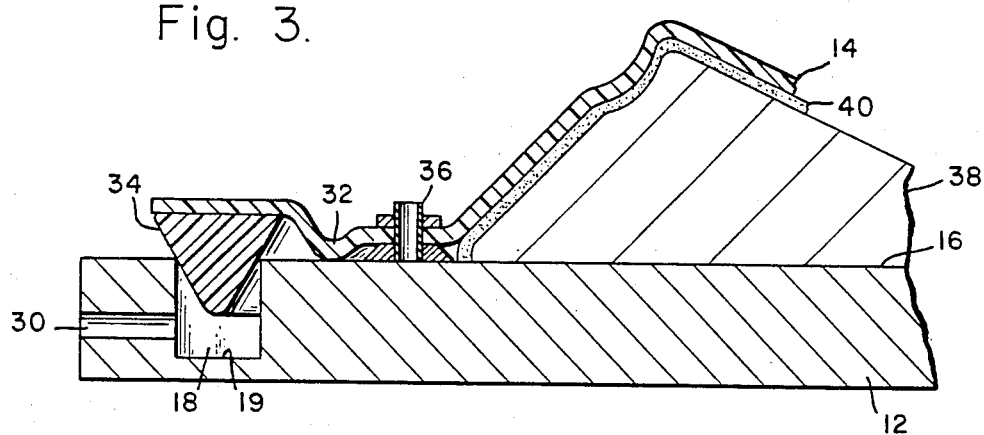
FIG. 3 is a cross-sectional view similar to that of FIG. 2, but depicting an alternate embodiment.
Figure 4:
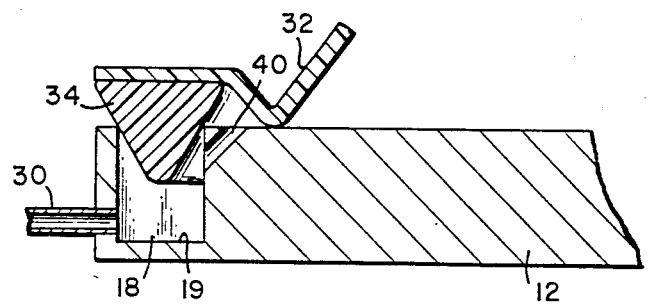
FIG. 4 is a cross-sectional view similar to that of FIG. 2, but depicting yet another alternate embodiment.
Figure 5:
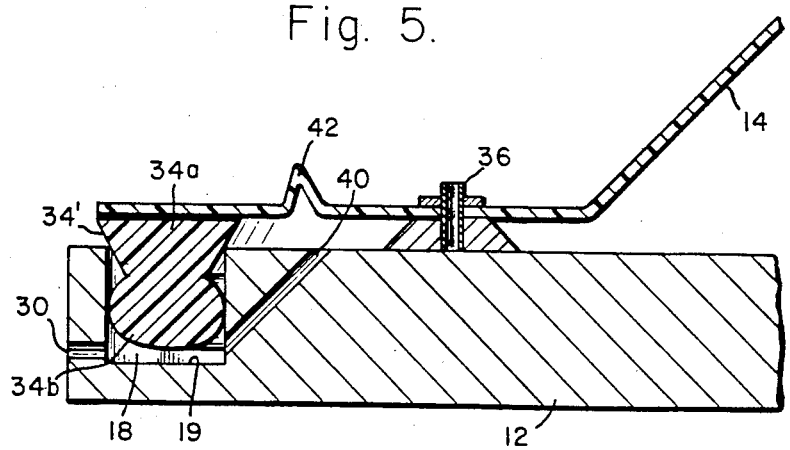
FIG. 5 is a cross-sectional view similar to that of FIG. 2, but depicting still another alternate embodiment.

Alternate configurations employing the vacuum bag of the invention are depicted in FIGS. 3, 4 and 5.

In FIG. 3, one or more vacuum ports 36 are formed in the edge member 32 for drawing a vacuum in the chamber 28. FIG. 3 depicts a tool or work piece 38, over which a series of plies, forming a laminate 40, are placed. As can be seen, the contoured diaphragm 14 is shaped to the contour of the tool 38.

This configuration provides sealing of the V-shaped seal 34 to both sides of the seal groove 19, and isolates the seal groove from the effects of a leak in the contoured diaphragm 14. Evacuation of the chamber 28 is provided by one or more independent vacuum ports 36, formed in a portion of the edge member 32.

In FIG. 4, the vacuum in the chamber 28 is drawn through a ring of spaced vacuum ports 40, which communicate directly with the vacuum manifold 18. The advantage of this configuration is that the chamber 28 may be evacuated without the need for outside plumbing, such as depicted in FIG. 1.

The preceeding embodiments have disclosed a solid conformable seal which provide a single or primary seal against the peripheral vacuum groove 19, sealing against both sides thereof. The embodiment depicted in FIG. 5 is intended to provide a combination V-shaped/-bulbous-shaped (in cross-section) seal 34', more conveniently termed a keyhole seal, due to its cross-sectional shape. The V-shaped portion 34a contacts the edges of the peripheral groove 19, as above, and forms an airtight primary seal thereagainst.

The airtight seal is reinforced when the temperature rises during the heating of the assembly, such as in autoclaving. During the heating process, the bulbous portion 34b expands inside the peripheral groove 19 to thereby reinforce the airtight seal formed by portion 34a and form a secondary seal against the peripheral groove 19. Advantageously, an intumescent elastomeric material capable of withstanding the autoclave temperatures employed in this art is utilized for the diaphragm 14 and seal 34'; such materials are well-known and form no part of this invention.

To accommodate expansion and contraction, an expansion joint 42 is also provided. The expansion joint 42 provides flexibility in placement of the diaphragm 14 over the work piece (not shown in FIG. 5).

Having described the major components of the bonding apparatus 10, its mode of operation will now be briefly described.

Composite plies or laminations 40 are laid up in the chamber 28 over the work piece or tool 38. The diaphragm 14 is placed over the composite plies, with the seal 34 or 34' inserted in the vacuum manifold 18, which lies outside the perimeter of the chamber 28. The vacuum is applied through evacuation port 30, which seals the V-shaped seal 34 (or V-shaped portion 34a) to the vacuum manifold 18. Vacuum is also applied to the chamber 28. As described above, heat may optionally be applied to the composite. As described above in connection with FIG. 5, heating causes additional sealing by the expansion of the bulbous portion 34b of the keyhole seal 34'.

After the debulk and cure cycles, the vacuum is vented and the diaphragm 14 is removed from the composite work piece. The process may be repeated with new composites, employing the same diaphragm 14 many times.

The bonding apparatus 10 may be suitably employed under autoclave or mechanical press pressure. Autoclave is intended for use for parts with contours, while a heated platten press could be employed for flat loads of composite parts.

Advantageously, an instant seal is formed by introduction of a vacuum, which is reinforced by the vacuum inside the diaphragm 14 and by ambient pressure outside thereof. Vacuum leaks are easy to detect when vacuum is first applied, due to the noise created by the leak.

Thus, there has been disclosed a uniquely designed bonding apparatus and a method for use thereof which enables one to fabricate composite laminate materials economically and skillfully, employing a reusable, contoured or conformable diaphragm. Those of ordinary skill in the art will at once recognize that various changes, modifications and alterations may be made to the bonding device as disclosed herein, but all such changes, modifications and alterations will not depart from the essence and spirit of the invention, and all such changes, modifications and alterations are intended to be covered by the appended claims.

What is claimed is:

1. A bonding apparatus for vacuum bagging comprising:
   (a) a base having a top surface provided with an outer peripheral vacuum manifold;
   (b) a diaphragm having a top member and a downwardly depending side wall adapted for placement on said base and in conjunction therewith defining a chamber and encompassing vacuum ports;
   (c) an evacuation port connected to a vacuum source whereby said chamber may be evacuated of ambient atmosphere to form a vacuum therein; and
   (d) an edge member associated with said side wall, including a solid, conformable seal adapted to provide at least a first seal against said outer peripheral vacuum manifold.

2. The apparatus of claim 1 which includes a wire connector extending from the exterior of said device to the interior of said chamber in fluid-tight relationship therewith and being adapted to accommodate electrical energy connection thereto.

3. The apparatus of claim 1 wherein said solid, conformable seal is integrally formed with said edge member.

4. The apparatus of claim 1 wherein said top member, said side wall, said edge member and said solid, conformable seal are integrally formed to comprise said diaphragm.

5. The apparatus of claim 1 wherein said diaphragm comprises an elastomeric material.

6. The apparatus of claim 1 wherein said evacuation port comprises an inner peripheral vacuum port between said outer peripheral vacuum manifold and said chamber.

7. The apparatus of claim 6 wherein said evacuation port comprises a ring of spaced vacuum ports, communicating with said vacuum manifold.

8. The apparatus of claim 6 wherein said evacuation port comprises a groove, communicating with said vacuum manifold.

9. The apparatus of claim 8 additionally comprising at least one vacuum port formed in the base within the area of said chamber.

10. The apparatus of claim 6 wherein said evacuation port is formed in said edge member of said diaphragm.

11. The apparatus of claim 1 wherein said solid, conformable seal is V-shaped in cross-section and provides a primary seal against said vacuum manifold.

12. The apparatus of claim 1 wherein said solid, conformable seal has a keyhole shape in cross-section, comprising a V-shaped portion which provides a primary seal against said vacuum manifold and a bulbous-shaped portion which provides a secondary seal against said vacuum manifold.

13. A bonding apparatus for vacuum bagging comprising:
   (a) a base having a top surface provided with a outer peripheral vacuum manifold;
   (b) a conformable diaphragm having a top member and a downwardly depending sidewall adapted for placement on said base and in conjunction therewith defining a chamber and encompassing vacuum ports;
   (c) an evacuation port communicating with said peripheral vacuum manifold and connected to a vacuum source whereby such chamber may be evacuated to form a vacuum therein;
   (d) and an edge member associated with said side wall and including a solid conformable seal which is V-shaped in cross-section and provides a seal against said outer peripheral vacuum manifold.

14. The apparatus of claim 13 further having an electrical connector for use in the bonding operation.

15. The apparatus of claim 13 wherein said diaphragm comprises an elastomeric material.

* * * * *